United States Patent
Haynold

(10) Patent No.: US 9,313,304 B1
(45) Date of Patent: Apr. 12, 2016

(54) SINGLE-CONTROL IMAGE-TAKING APPARATUS

(71) Applicant: Oliver Markus Haynold, Evanston, IL (US)

(72) Inventor: Oliver Markus Haynold, Evanston, IL (US)

( * ) Notice: Subject to any disclaimer, the term of this patent is extended or adjusted under 35 U.S.C. 154(b) by 192 days.

(21) Appl. No.: 13/902,934

(22) Filed: May 27, 2013

Related U.S. Application Data

(60) Provisional application No. 61/652,777, filed on May 29, 2012.

(51) Int. Cl.
*H04M 1/02* (2006.01)
*H04N 5/232* (2006.01)

(52) U.S. Cl.
CPC ......... *H04M 1/0264* (2013.01); *H04N 5/23296* (2013.01)

(58) Field of Classification Search
CPC .......... H04N 5/23245; H04N 5/23212; H04N 5/23216; H04N 5/2354; H04N 5/232; H04N 5/23296; H04M 1/0264; H04M 2250/52
See application file for complete search history.

(56) References Cited

U.S. PATENT DOCUMENTS

| | | | |
|---|---|---|---|
| 6,919,927 B1 | 7/2005 | Hyodo | |
| 7,085,590 B2 | 8/2006 | Kennedy | |
| 7,295,242 B2 | 11/2007 | Gotanda | |
| 7,321,395 B2 | 1/2008 | Gotanda | |
| 7,406,331 B2 | 7/2008 | Middleton | |
| 7,738,029 B2 | 6/2010 | Kobayashi | |
| 8,665,358 B2 | 3/2014 | Cho et al. | |
| 8,811,948 B2 | 8/2014 | Bandyopadhyay et al. | |
| 8,886,030 B2 | 11/2014 | Misawa | |
| 2007/0135180 A1* | 6/2007 | Eaton | 455/575.1 |
| 2009/0207282 A1* | 8/2009 | Sasaki et al. | 348/240.3 |
| 2010/0020222 A1* | 1/2010 | Jones et al. | 348/333.02 |
| 2011/0090313 A1* | 4/2011 | Tsuchita | 348/46 |
| 2012/0120277 A1* | 5/2012 | Tsai | H04N 5/23293 348/223.1 |
| 2014/0036128 A1 | 2/2014 | Choi | |

* cited by examiner

*Primary Examiner* — Ahmed A Berhan

(57) ABSTRACT

According to one embodiment, an image-taking apparatus wherein a first actuation of a control element locks image-taking parameters and a subsequent actuation of this control element causes a picture to be taken. In one embodiment, the apparatus is a cellular telephone equipped with a camera wherein a first press on the volume up button locks focus and exposure. The photographer can then recompose the picture according to the 'half-press' technique and take a picture with a subsequent press on the volume up button. Other embodiments are described.

57 Claims, 2 Drawing Sheets

SINGLE-CONTROL IMAGE-TAKING APPARATUS

CROSS-REFERENCE TO RELATED APPLICATIONS

Figure 1:
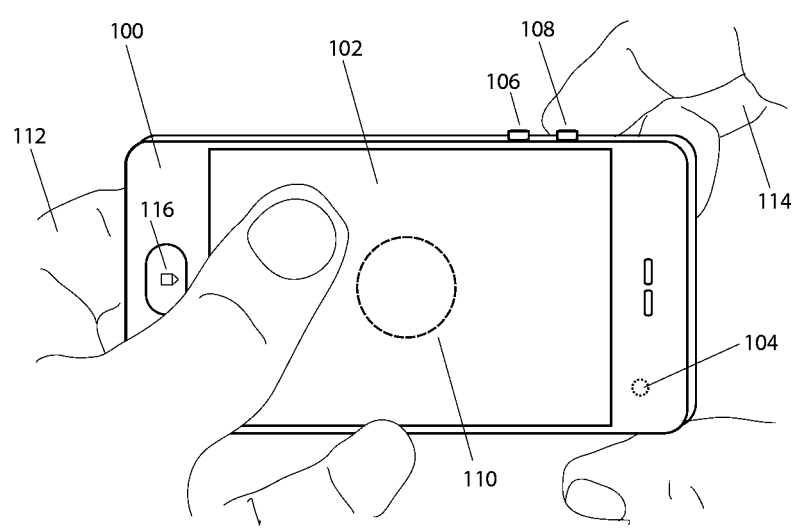

This application claims the benefit of provisional patent application 61/652,777, filed on 29 May 2012 by the present inventor.

BACKGROUND

1. Prior Art

The following is a tabulation of some prior art that presently appears relevant:

| Pat. No. | Kind Code | Title | Issue Date | Patentee |
|---|---|---|---|---|
| 7,085,590 | B2 | Mobile terminal with ergonomic imaging functions | Aug. 1, 2006 | Peter J Kennedy et al. |
| 7,406,331 | B2 | Use of multi-function switches for camera zoom functionality on a mobile phone | Jul. 29, 2008 | David Desmond Middleton |
| 7,738,029 | B2 | Image-taking apparatus that shoots a still image when a release button is pressed | Jun. 15, 2010 | Koji Kobayashi |

2. Background

In cameras equipped with automatic functions to set focus or exposure parameters, there has evolved a convention on how to set these parameters. Commonly, the shutter button on these cameras is built as a two-stage button. When the user depresses the shutter button partially, the camera selects certain image-taking parameters, such as focus, aperture, exposure time, or sensor sensitivity, to values depending on what is in the camera's field of view at that moment. Then these parameters get locked. Together, aperture, exposure time, and sensor sensitivity determine the exposure value of the image to be taken, a concept well known in the art. The user can then 'recompose' the picture by pointing the camera in a different direction while holding the shutter button partially depressed. When the user is ready to take the picture, he depresses the shutter button fully, and a picture will be taken with the image-taking parameters that have been previously locked. This is an intuitive user interface that provides the photographer much creative control. However, the need for the user's tactile differentiation between a light press for the first step and a firm press for the second step also presents challenges when the user's fine motor control is impaired, for example by cold weather, gloves, or disability.

The method of partially depressing a shutter button to set and lock image-taking parameters and fully depressing that same shutter button to take the picture, as well as the terminology of 'half press' and 'full press,' have become so widespread that U.S. Pat. No. 7,738,029 specifically teaches the use of a "release button [that] is a two-step type which lends itself to a half press and full press" in the context of a method to measure exposure.

Recent years have seen the introduction of many multimedia devices, for example personal digital assistants, media players, and mobile telephones, that are also equipped with cameras capable of taking still images and/or videos. A few of these devices are equipped with a traditional two-step button specifically dedicated to use as a shutter button when the device is being used for taking pictures. However, this concept has not become very popular. In contrast to the traditional shape of dedicated cameras, many multimedia devices are more miniaturized and often have the shape of a very flat rounded cuboid. This makes is difficult to include a two-step button on the device's narrow lateral surfaces, which are the natural position for a shutter button. It is also harder for the user to feel the tactile difference between a half and a full press on a highly miniaturized button of a small multimedia device compared to the larger shutter button on a dedicated camera.

Further, on a multimedia device where image taking is just one of many uses and not usually the primary one, it would be impractical to include a separate suite of buttons dedicated to image taking. U.S. Pat. No. 7,406,331 teaches the use of existing buttons normally used for communication functions on a mobile telephone equipped with a camera to control zooming the built-in camera and zooming pictures shown on the telephone's display. The benefit of this method is somewhat limited because most of the highly miniaturized cameras in mobile telephones do not have an optical zoom function. Adoption of this method appears to be limited if it has been adopted at all.

Instead, a different convention regarding the use of the volume buttons on mobile telephones has evolved. For example, recent versions of the popular iPhone®, made by Apple, Inc. of Cupertino, Calif., use the volume buttons as a shutter button. By pushing either volume button, the user can trigger an image to be taken.

U.S. Pat. No. 7,085,590 teaches the use of separate portrait and landscape display modes on mobile terminal devices with built-in camera functions.

We are now seeing the widespread adoption of touch-sensitive screens on mobile multimedia devices. A common method of setting exposure parameters on devices so equipped is by gestures to move the point of the picture which the autofocus should make sharpest or which the metering system should set aperture, exposure time, and/or sensitivity for. Shutter release is commonly accomplished by touching a specific area of the touchscreen or, less often, by pushing a button on the device. This method is counterintuitive for experienced photographers because instead of the traditional point/half press/recompose/full press sequence now one has to hold the device steady with one hand while making gestures on the screen with the other hand to set image-taking parameters and eventually take the picture. It is also difficult to hold the device steady with one hand between its narrow edges while making touch inputs on the screen with the other hand, in part because modern portable multimedia devices often are very narrow, making a steady hold difficult, and in part because the force of tapping on the screen is applied orthogonally to the force of the hand holding the device. This method of controlling exposure on a touch screen also makes use of this method very difficult for users that have use of only one hand, either because of disability or because they simply have their other hand occupied.

Thus, the methods of releasing the shutter on a camera known heretofore suffer from several disadvantages. The method commonly used for dedicated cameras requires a button with two separate contacts for half-press and full-press. Considerations of cost, size, and ergonomics make this approach impractical to implement in small multimedia devices such as cellular telephones. This method also is impractical when the user's tactile sensitivity is impaired by weather, gloves, or disability. The methods commonly used by the camera function on cellular telephones or other multimedia devices suffer from distinct disadvantages. They are counterintuitive for experienced photographers and demand that the device be held with one hand and the touchscreen manipulated with the other for setting image-taking parameters, which is difficult, time-consuming, and almost impossible to perform with one hand.

SUMMARY

In accordance with one embodiment, a portable multimedia device equipped with a camera and using a one-step button for shutter release and the same one-step button for locking focus and exposure, wherein the first press on the shutter release button locks focus and exposure and a subsequent press of said button takes the picture.

Advantages

Several advantages of one or more aspects are as follows: to avoid the need for a separate two-step shutter button, to allow miniaturization of the device, to allow the setting of image-taking parameters and taking pictures while holding the device steadily with two hands, to reduce latency between shutter button press and shutter release, to make the image-taking workflow intuitive for experienced photographers, to make image-taking easier for users with temporarily or permanently impaired tactile or fine-motor skills, and to allow setting of exposure parameters with only one hand.

DRAWINGS

Figures

Figure 2:
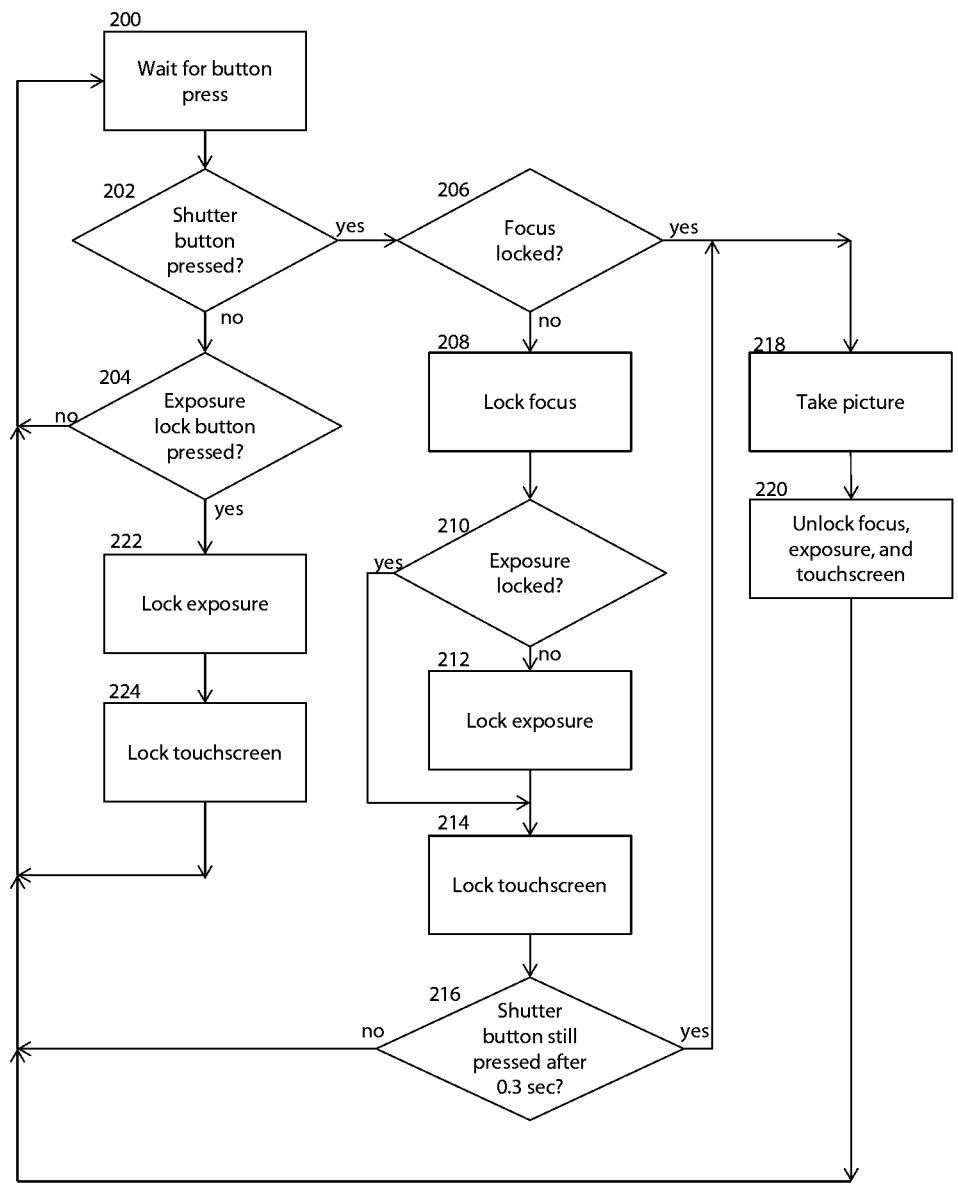

FIG. 1 shows an embodiment of the invention where the device is a cellular telephone FIG. 2 shows a flow chart of one embodiment of the invention

DRAWINGS

Reference Numerals

100 Cellular telephone
102 Touchscreen
104 Camera facing away from user
106 Volume down button
108 Volume up button
110 Center mark displayed on screen
112 User's left hand
114 User's right hand
116 Multifunction button
Numerals 200-224 are labeled on the flow chart

DETAILED DESCRIPTION

FIGS. 1 and 2—First Embodiment

One embodiment of the invention is illustrated in FIG. 1. A cellular telephone 100, or a multimedia device of a similar form factor, is equipped with a touch-sensitive screen ('touchscreen') 102, a camera facing away from the touchscreen 104, a volume down button 106 at the side of the telephone, and a volume up button 108 at the side of the telephone. It may also be equipped with additional buttons or other user interface elements not shown here. When the cellular telephone is set to a mode for picture-taking, a ring-shaped center mark 110 is displayed on its screen. The user holds the telephone, giving it stability with his left hand 112, and operating the volume down button 106 and volume up button 108 with his right hand while also stabilizing the phone with this hand. In camera mode, the volume down button 106 serves as the exposure-lock button and the volume up button 108 serves both as a lock-focus button and as a shutter button as explained next.

Operation Flow—FIGS. 1 and 2

It is assumed that the telephone has already been set to camera mode. This can be achieved by the user selecting a camera application on the telephone's touchscreen and is well known in the art. In camera mode, the touchscreen 102 displays the picture the camera sees currently (not shown in the drawing), a center mark 110, and possibly some additional information such as the currently selected exposure mode (not shown). Since the touchscreen may offer additional functionality by touching it, the user may still have to hold the telephone without touching the touchscreen at this point in time.

Moving to the control flow in FIG. 2, in the initial step 200 the telephone waits for a button press on either the volume down button 106 or volume up button 108. It might also respond to additional input on the touchscreen or by other control elements it is equipped with. The exposure and focus are not locked initially.

If the user depresses the volume up button 108 now serving as the focus-lock and shutter button, step 202 moves the control flow to step 206, which checks if the focus has already been locked. The first time the user presses the button, this will not be true because the focus is not locked initially. If the focus is not yet locked, the control flow will lock the camera focus in step 208 so that the part of the picture marked by the center marker 110 is in focus. It will also check in step 210 whether exposure has already been locked, and if this is not true it will lock exposure, too, in step 212, so that the part of the picture marked by the center marker 110 will be optimally exposed. It will also in step 214 lock the touchscreen 102, making it insensitive to touch input, and allowing the user to grasp the telephone firmly with both hands 112 and 114 without regard to touching the touchscreen.

Step 216 then checks whether the shutter button 108 has been depressed by the user for more than 0.3 seconds. If so, it takes a picture in step 218, releases the focus and exposure lock in step 220, and returns to the original state waiting for control input at step 200. The user moving his fingers away from the touchscreen after the exposure will not be taken as a touchscreen input. This 0.3 second delay means that the user can lock focus without taking a picture by a short press on the volume up button 108; on the other hand, a longer press on this button locks focus and then takes a picture. There is no appreciable loss of latency in the second case because the camera's autofocus needs about 0.3 seconds to set focus anyhow, whereas very low latency can be achieved in the first case since exposure and focus are already locked.

If the user depresses the shutter button 108 and step 206 finds that focus has already been locked, the camera immediately takes a picture in step 218, releases the focus and exposure lock in step 220, and returns to the initial state at step 200.

If the user depresses the volume down button now serving as the exposure-lock button 106, step 204 moves the control flow to step 222 causing the camera to lock exposure so that the part of the picture marked by the center marker 110 will be optimally exposed, locks the touchscreen 224, and continues to wait for a button press at step 200.

The multifunction button 116 may be assigned the same function as the volume button 108. Its arrangement collinear with the camera axis increases the risk of inadvertently rotating the camera, but because it is on the telephone's wide front and not its slim side, this button can be much larger than the volume buttons, which may simplify operation with gloves or for disabled users.

Locking the exposure value in steps 212 and 222 may be accomplished by automatically determining an optimal combination of aperture, exposure time, and sensor sensitivity for the part of the scene marked by the center marker 110. Alternatively, up to two of these three parameters may be set to predetermined values, and exposure value is then set by automatically determining an optimal combination of the remaining free parameters. For example, the camera's aperture may be set to a fixed value that cannot be changed and sensor sensitivity may be set to a given value by the user in the device's menu; in this case locking exposure value is accomplished by determining and locking an optimal value for the exposure time.

User Techniques—FIGS. 1 and 2

The control flow described above enables the user to employ several different techniques to take a picture, depending on the user's needs and skills and a given situation's tradeoff between speed and creative control.

Most simply, the user may employ the 'point-and-shoot' technique and point the camera at the object of interest in a scene so that the center marker 110 marks that object of interest, press the shutter button 108, and hold it down for more than 0.3 seconds. In this case, the camera will automatically lock focus in steps 200, 202, 206, and 208, lock exposure in steps 210 and 212, lock the touchscreen in step 214, take a picture in steps 216 and 218, and return to the original state in steps 220 and 200.

In a situation that requires more creative control, the user may employ the 'half-press technique' (thus called in the photographic literature because it is traditionally performed by depressing a shutter button halfway, even though in the present embodiment there is no half-press of the button). In this technique, the user points the camera at the object of interest so that the center marker 110 aligns with that object and briefly depresses the focus-lock/shutter button 108. Now the focus and exposure are locked so that the object of interest will be shown sharp and properly exposed once a picture is taken. The user can now recompose the picture by pointing the camera in a different direction so that the object of interest is no longer in the center of the picture. This may be aesthetically more pleasing or allow the user to move another element of secondary interest into the picture that would not have been visible with the object of primary interest in the center of the picture. It also means that the camera will not have to lock focus and exposure before taking a picture, which reduces the latency between a press of the shutter button and the picture being taken. When the user now presses the shutter button 108 again, a picture will be taken with low latency and with the object originally selected in focus and properly exposed.

A yet more sophisticated possibility is the 'exposure-lock' technique which the user may employ in situations with difficult lighting. For example, if the object of interest is very bright, the user may want to lock focus on that object, but lock exposure against some more neutral element in the scene. This can be achieved by lining the camera up so that the center marker 110 is lined up with an element of neutral brightness, ideally neutral grey, and depressing the exposure-lock button 106. Then the user proceeds with the 'half-press technique' or the 'point-and-shoot technique' as described above. In this way it is possible to take a picture where exposure is set to be optimal for one element of the picture, focus is set on a different element, and neither element necessarily has to be aligned with the center of the image.

Where the control flow locks exposure in steps 222 or 212, the camera may only lock aperture, exposure time, and sensor sensitivity, or it may also lock white balance in addition to those exposure parameters. Whether white balance is also locked may be set by the user in a menu.

Additional Embodiments

There are various possibilities with regard to the physical layout of the user controls and the control flow governed by them. In one embodiment, instead of a physical button, the image-taking apparatus's touch screen 102 is used for locking image-taking parameters and taking pictures, taking the function of the volume up button 108 in the first embodiment. This allows the user to touch anywhere on the screen to lock parameters and to take a picture instead of having to touch very precisely the area for which image-taking parameters are locked and then a small area of the screen that serves as the shutter button. Thus, the whole screen can serve as a button for setting image-taking parameters and taking a picture, which may be particularly suitable for disabled users or highly miniaturized devices. A small part of the screen marked with a "Done" button or a button on the device may be used to exit the camera mode.

In another embodiment, the apparatus, which may be a digital single-lens reflex camera or a compact camera, is equipped with a separate shutter button that is equipped with an ordinary half-press function where in normal operation depressing this button partially locks image-taking parameters and depressing it fully causes a picture to be taken. A special setting on the image-taking apparatus allows the half-press function to be disabled and then the apparatus uses the control flow of the first embodiment where the first full press on the shutter button locks exposure parameters and a subsequent press causes the picture to be taken, with the full-press function of the camera's shutter button taking the function the volume up button 108 in the first embodiment and the camera's exposure-lock button, if so equipped, taking the function of the volume down button 106 in the first embodiment.

In a further embodiment, the control flow of the first embodiment is changed so that the volume up button 108 always causes an image to be taken and the volume down button 106 always causes focus, exposure, and white balance to be locked. This allows less creative control than the first embodiment but may be more intuitive for inexperienced photographers, and still makes it easy for the user to set focus and exposure without moving his hands.

Advantages

From the description above, a number of advantages of some embodiments of my image-taking apparatus become clear:
  (a) It is possible to use the 'half-press technique,' which many experienced photographers find intuitive, on devices not equipped with shutter buttons that can distinguish a half press from a full press.
  (b) Since one-stage control buttons without a half-press function are much cheaper than two-stage buttons, manufacturing costs get reduced.

(c) A button where a two-stage tactile feedback would be unintuitive, such as a volume button on a cellular telephone, can be repurposed as a shutter button for the half-press technique.

(d) The photographer can use the intuitive action of pointing the camera in the direction of interest to set the area of the image for which image-taking parameters are to be locked instead of having to work a touch screen, cursor keys, or other less intuitive methods.

(e) The apparatus is particularly suitable in situations with reduced motor control, such as with gloves, in the cold, or for users with a physical impairment, or when a touch screen is unreliable, such as in the rain, since only one button needs to be pressed for most operations.

(f) It becomes much quicker to set image-taking parameters and take a picture since the photographer's finger can rest on the shutter button instead of having to search for other control elements.

(g) Whereas pushing an area of the touchscreen would rotate the direction in which the camera is looking, possibly causing motion blur, the push of the button is orthogonal to the camera's lens axis.

(h) The apparatus can be firmly held with two hands.

(i) If the apparatus needs to be held by one hand it is still possible to set focus and exposure quickly and intuitively.

CONCLUSION, RAMIFICATIONS, AND SCOPE

Accordingly, the reader will see that the image-taking apparatus described here can be used to allow photographers used to the half-press technique to take pictures of high quality on a device that is not equipped with a two-stage shutter button or when the two-stage shutter button would be impractical to use. It becomes possible to hold the apparatus firmly with both hands, with the hands remaining in the same position, to set image-taking parameters quickly by pointing the apparatus at the relevant part of the picture to be taken, and to take a picture.

Although the description above contains many specificities, these should not be construed as limiting the scope of the embodiments, but merely as providing illustrations of some of several embodiments. A reader skilled in the art will see that the physical buttons of the embodiments discussed could be replaced by any other control element capable of operation as a momentary on switch, such as a touch screen, slider, one side of a volume rocker button, an optical proximity switch, remote control, etc.

Similarly, a reader skilled in the art will see that the image-taking parameters to be set are not constrained to focus and exposure and to the particular arrangement of button functions shown in FIGS. 1 and 2. For example, focus could be set manually and two buttons would be used in the way described above to set white balance and exposure rather than exposure and focus. Also, a press on the shutter button need not cause one picture to be taken immediately but might trigger the release of another of the 'drive modes' well-known in the art such as taking a picture after a delay, continuously taking pictures as long as the button is pressed, taking a 'bracket' of several pictures, a motion picture, etc. Even though a cellular telephone equipped with a touchscreen has been used in the description of the first embodiment, the apparatus need not be a telephone; for example, it could be a multimedia player, and need not be equipped with a touchscreen.

The center mark 110 need not be fixed at the screen's center. In some embodiments it may be moved around by the user, such as by dragging it on the touchscreen, to a different location, and then focus and exposure will be locked to whatever the center mark in its new position is pointing at during the moment that these parameters are being locked.

Thus the scope of the embodiments should be determined by the appended claims and their legal equivalents, rather than by the examples given.

I claim:

1. An apparatus comprising a camera and at least one binary control element,
    said binary control element being characterized by having exactly two mutually exclusive user interaction states, actuated and non-actuated, and being adapted so that an actuation by a user transitions said binary control element from said non-actuated state to said actuated state,
    wherein a first actuation of said binary control element locks at least one image-taking parameter of said camera and a subsequent actuation of said binary control element causes a picture to be taken by said camera using said image-taking parameter locked by said first actuation.

2. The apparatus of claim 1 where said apparatus is primarily intended for use as a camera.

3. The apparatus of claim 1 where said apparatus is a cellular telephone.

4. The apparatus of claim 1 where said apparatus is primarily intended for use as a multimedia player.

5. The apparatus of claim 1 wherein said binary control element is a button.

6. The apparatus of claim 5 wherein said button is a volume button.

7. The apparatus of claim 5 wherein said button is one part of an assembly capable of being transitioned between more than two user interaction states in some applications, adapted in the control of said camera to interpret at least one of said states as said non-actuated state and at least one of said states as said actuated state and to interpret all of said user interaction states either as said actuated state or as said non-actuated state.

8. The apparatus of claim 7 wherein said button is a half-press shutter button adapted to interpret both its not-pressed state and its half-press state as being in said not-actuated state and its fully-pressed state as being in said actuated state.

9. The apparatus of claim 1 wherein said binary control element is an area of a touchscreen used as a single binary control element.

10. The apparatus of claim 1 wherein said binary control element is arranged so that the force required to actuate it is substantively orthogonal to said camera's lens axis.

11. The apparatus of claim 1 wherein said binary control element is arranged so that the force required to actuate it is substantively collinear to said camera's lens axis.

12. The apparatus of claim 1 wherein said image-taking parameter is the camera focus.

13. The apparatus of claim 1 wherein said image-taking parameter is the exposure value.

14. The apparatus of claim 1 wherein said image-taking parameter is the white balance.

15. The apparatus of claim 1 wherein an actuation of said binary control element for more than a predetermined time limit is taken as a subsequent actuation, said time limit being chosen so that a user may conveniently either release said binary control element before said time limit expires or continue actuating said binary control element until said time limit expires.

16. An apparatus comprising a camera and two volume control elements wherein actuation of a first of said volume control elements locks at least one image-taking parameter of said camera and subsequent actuation of the other of said volume control elements causes a picture to be taken by said camera using said image-taking parameter locked by said previous actuation of said first volume control element.

17. The apparatus of claim 16 where said apparatus is a cellular telephone.

18. The apparatus of claim 16 where said apparatus is primarily intended for use as a multimedia player.

19. The apparatus of claim 16 wherein said volume control elements are buttons.

20. The apparatus of claim 16 wherein said volume control elements are arranged so that the force required to actuate them is substantively orthogonal to said camera's lens axis.

21. The apparatus of claim 16 wherein said image-taking parameter is the camera focus.

22. The apparatus of claim 16 wherein said image-taking parameter is the exposure value.

23. The apparatus of claim 16 wherein said image-taking parameter is the white balance.

24. A method for controlling image-taking parameters and triggering the taking of an image by a camera using at least one binary control element,
    said binary control element being characterized by having exactly two mutually exclusive user interaction states, actuated and non-actuated, and being adapted so that an actuation by a user transitions said binary control element from said non-actuated state to said actuated state,
    wherein a first actuation of said binary control element locks at least one image-taking parameter of said camera and a subsequent actuation of said binary control element causes a picture to be taken by said camera using said image-taking parameter locked by said first actuation.

25. The method of claim 24 wherein said binary control element is a button.

26. The method of claim 25 wherein said button is a volume button.

27. The method of claim 24 wherein said binary control element is an area of a touchscreen used as a single binary control element.

28. The method of claim 24 wherein said image-taking parameter is the camera focus.

29. The method of claim 24 wherein said image-taking parameter is the exposure value.

30. The method of claim 24 wherein said image-taking parameter is the white balance.

31. The method of claim 24 wherein an actuation of said binary control element for more than a predetermined time limit is taken as a subsequent actuation, said time limit being chosen so that a user may conveniently either release said binary control element before said time limit expires or continue actuating said binary control element until said time limit expires.

32. A method for controlling a camera using an apparatus equipped with two volume control elements wherein actuation of a first of said volume control elements locks at least one image-taking parameter of said camera and subsequent actuation of the other of said volume control elements causes a picture to be taken by said camera using said image-taking parameter locked by said previous actuation of said first volume control element.

33. The method of claim 32 where said apparatus is a cellular telephone.

34. The method of claim 32 where said apparatus is primarily intended for use as a multimedia player.

35. The method of claim 32 wherein said volume control elements are buttons.

36. The method of claim 32 wherein said volume control elements are arranged so that the force required to actuate them is substantively orthogonal to said camera's lens axis.

37. The method of claim 32 wherein said image-taking parameter is the camera focus.

38. The method of claim 32 wherein said image-taking parameter is the exposure value.

39. The method of claim 32 wherein said image-taking parameter is the white balance.

40. A portable apparatus comprising
    a volume control element primarily dedicated to lowering the volume of an audio signal,
    a volume control element primarily dedicated to increasing the volume of an audio signal, and
    a microprocessor,
    said microprocessor being adapted to switch between different user interaction states, and
    said microprocessor further being adapted so that in some of said user interaction states a first actuation of one of said volume control elements causes a first predetermined action not related to changing said volume and a subsequent actuation of said volume control element causes a second predetermined action not related to changing said volume,
    said first predetermined action comprising one predetermined sequence of steps, and
    said second predetermined action comprising another predetermined sequence of steps substantively different from said sequence of steps of said first action.

41. The apparatus of claim 40 where said volume control element needs to be released before a new actuation is taken as a subsequent actuation.

42. The apparatus of claim 40 where actuating said volume control element for more than a predetermined time is taken as subsequent actuation of said volume control element.

43. The apparatus of claim 42 where said actions not related to changing the volume are operating a camera.

44. The apparatus of claim 43 where said first actuation locks an image-taking parameter of said camera.

45. The apparatus of claim 43 where a continuous actuation of said volume control element causes continuous taking of pictures by said camera.

46. The apparatus of claim 43 where said apparatus is a mobile telephone.

47. The apparatus of claim 43 where said apparatus is a multimedia player.

48. The apparatus of claim 42 where said predetermined time is longer than the time required to complete said predetermined action caused by said first actuation of said volume control element.

49. A machine-implemented method for controlling a software-implemented function on a portable apparatus, comprising at least one processor controlling said apparatus
    observing actuation of a volume control element primarily dedicated to changing the audio volume on a portable device, contingent upon said device being in a state where a function other than changing said volume is desirable upon actuation of said volume control element,
    checking from state stored in electronic memory whether said actuation of said volume control element is to be taken as a first or as a subsequent actuation of said volume control element,
    executing a first predetermined software action not related to changing said volume if said actuation is to be taken as a first actuation, and executing a second predetermined software action not related to changing said volume if said actuation is to be taken as a subsequent actuation, said first predetermined action comprising one predetermined sequence of steps, and said second predetermined action comprising another predetermined sequence of steps substantively different from said sequence of steps of said first action.

50. The method of claim 49 wherein said volume control element needs to be released before a new actuation is taken as a subsequent actuation.

51. The method of claim 49 wherein an actuation of said volume control element for more than a predetermined time is taken as a subsequent actuation.

52. The method of claim 51 wherein said actions not related to changing said volume are operating a camera.

53. The method of claim 52 wherein said first actuation of said volume control element locks an image-taking parameter of said camera.

54. The method of claim 52 wherein said actuation of said volume control element causes continuous taking of pictures by said camera substantively for as long as said actuation lasts.

55. The method of claim 54 wherein said volume-control element is part of a mobile telephone.

56. The method of claim 54 wherein said volume-control element is part of a multimedia player.

57. The method of claim 51 where said predetermined time is longer than the time required to complete said predetermined software action caused by said first actuation of said volume control element.

\* \* \* \* \*